United States Patent Office 2,814,273
Patented Nov. 26, 1957

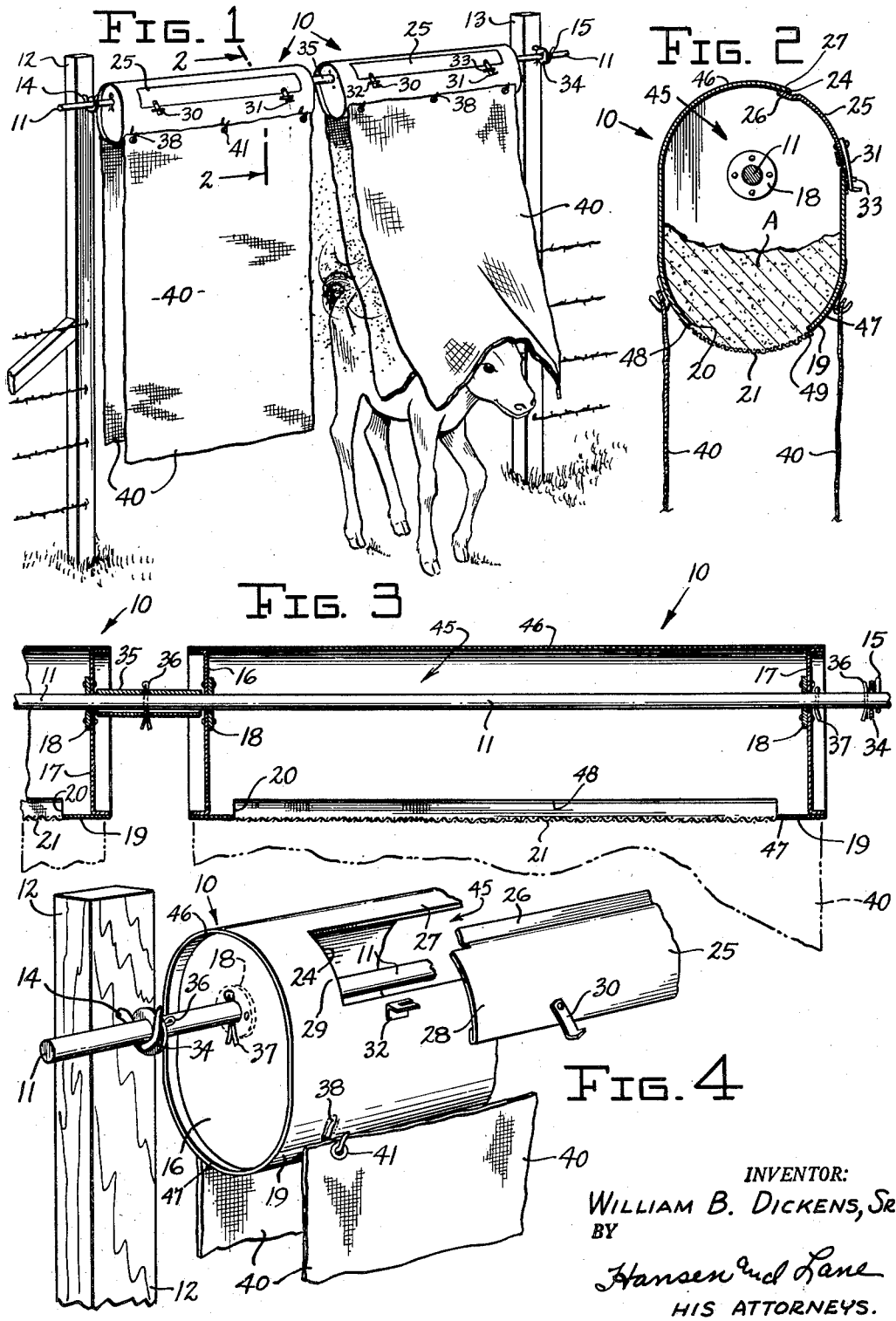

2,814,273
ANIMAL ACTUATED INSECTICIDE DUST APPLICATOR

William B. Dickens, Sr., Watsonville, Calif.

Application March 21, 1955, Serial No. 495,503

2 Claims. (Cl. 119—159)

This invention relates to dust applicators and pertains more particularly to apparatus for dusting livestock with insecticide powders as the livestock passes beneath the apparatus.

As is well known, livestock are frequently troubled with various bothersome types of insects such as flies, ticks, mites, lice, etc., which prey upon them and render them irritable. This will cause the animals to spend considerable time seeking out bushes, trees, posts and the like where they attempt to scrape off the pests. This interferes with their grazing and feeding and results in loss of weight and/or decreases their milk production.

It has been common practice to attempt to alleviate the pest problem in livestock by individually treating each animal. Since this requires, at each dusting, that the animals be rounded up and then individually dusted within the corral or a box stall, it will be appreciated that the operation turns out to be quite expensive due to the man hour cost of the labor involved.

It is therefore an object of the present invention to provide a duster of the type adapted to be operated by the livestock. This contemplates an applicator suspended in any passageway frequently used by the stock, such as a gateway leading towards a fenced-in water hole or the like, or across any other lane which the animals must necessarily pass from time to time.

Another object of this invention is to provide a dust applicator for livestock which will be capable of carrying a sufficient supply of insecticide powder to treat a considerable number of animals over an extended period of time, and which may be easily refilled with insecticide when necessary.

Still another object of this invention is to provide an insecticide duster which is rockably supported above a gateway and which is capable of discharging clouds of insecticide dust over the hide of each animal passing beneath it.

A further object is to provide a dust applicator for livestock having shrouds or curtains suspended from a rockably supported insecticide supply bin, said curtains acting when engaged by an animal to rock the supply bin and cause insecticide powder to be discharged therefrom, said curtains also acting to confine and direct the flow of the insecticidal clouds of powder toward the hides of the animals passing beneath the duster.

Other objects include low cost of manufacture and inherent simplicity which make for ease of maintenance of the dust applicator.

These and other objects and advantages of the invention will be apparent from the following description and the accompanying drawings, wherein:

Fig. 1 is a perspective view of a typical installation showing a pair of livestock dust applicators supported above a gateway and showing an animal passing therebeneath and being dusted with a cloud of insecticidal powder.

Fig. 2 is an enlarged sectional view taken on the line 2—2 of Fig. 1.

Fig. 3 is a longitudinal mid-sectional view showing an insecticide bin in its entirety and showing a fragmentary portion of the adjacent bin.

Fig. 4 is an enlarged perspective view of an end portion of one of the insecticide bins and showing the lid removed therefrom.

Referring in detail to the drawing, the numeral 10 refers to one or the other of a pair of identical rockably supported supply bins shown mounted in end-to-end position upon a single horizontally disposed cross bar 11 which spans the distance between two gateway posts 12 and 13. Each of the posts 12 and 13 has located near its top end, a bar support hook 14 and 15 respectively for receiving the respective ends of the cross bar 11 as shown. The posts 12 and 13 define a gateway through which livestock must pass from a pasture when going to a water hole or trough and back to pasture again.

As seen in Fig. 2, each insecticide supply bin 10 is generally ovoid or ellipsoidal in cross sectional shape. To this end the bin 10 consists of an elongated ovoid housing 45 having rounded upper and lower walls 46 and 47, respectively, and ovoid end walls 16 and 17 for closing the ends of such housing. As seen in Fig. 3 both end walls 16 and 17 of the bin 10 have a bearing boss 18 secured thereto through which the cross bar 11 extends. These bearings 18 are at a point somewhat elevated towards the upper portion of the bin 10 so that the bottom portion 19 of the bin 10 hangs somewhat pendulously from the cross bar 11. In other words, the bin has its upper end somewhat hingedly suspended from the cross bar 11. I prefer that the bearings 18 be disposed substantially radially relative to the rounded upper wall 46 of the bin 10. Most important, however, is the disposition of each bearing well above the center of the arc about which the rounded lower wall is formed so that the bin 10 is pendently suspended for swinging about the axes of the bearings 18.

The bottom 19 of the bin provided by the rounded lower wall 47 of the housing 45 is perforated to allow the powder to sift out of the bin. In the present disclosure the lower rounded wall 46 of each bin 10 is preferably provided with an elongated opening 20 which extends substantially the full length of the bin 10 between the end walls 16 and 17 thereof. The opening 20 has parallel side margins 48 and 49 so spaced as to leave the lower quadrant of the lower wall completely open. A fine mesh screen 21 overlies the opening 20 and is soldered to the end and side margins thereof. Thus the bin 10 is adapted to support the dusting powder A contained within the bin 10. However, upon swinging of the bin about the cross shaft 11 the powder A is shifted or tumbled so as to sift through the screen 21.

The dusting powder A is supplied into the bin 10 through an opening 24 in an upper quadrant of the rounded upper wall 46 of said bin. The opening 24 is suitably closed by a lid 25. The upper longitudinal edge of the lid 25 is provided with a depressed flange 26 which underlies the edge 27 of the opening 24 as shown in Fig. 2. The length of the lid 25 is somewhat longer than the length of the opening 24 so that the end portions 28 of the lid 25 overlie the edge portions 29 of the openings 24 (Fig. 4). The lid 25 is suitably fastened into place by a pair of pivoted latches 30 and 31 mounted thereon and which are adapted to engage a mating pair of latch plates 32 and 33, respectively, mounted upon the main body of the bin 10.

As shown in Fig. 3, the pair of individual bins 10 are spaced apart upon the cross bar 11 by means of an interposed sleeve 35 which is held in place upon the cross bar 11 by means of the cotter pin 36. At the outer ends of each bin 10 are provided cotter pins 37 which pass through the cross bar 11 and thereby restrain the bins 10 from axial movement upon the cross bar 11. A similar arrangement is used adjacent the hooks 14—15 as illustrated at the right end of Fig. 3. Here a washer 34 on the cross bar 11 is held against the hook 15 by a cotter pin 36. With a similar arrangement at the other end of the cross bar, the latter is secured against axial shifting relative to the hooks 14—15.

Along each side of the bins 10 are a plurality of hooks 38 which are adapted to suspend large rectangular burlap curtains 40 which hang downwardly in parallelism from each side of the said bins. The burlap curtains 40 may be provided with metallic eyelets 41 at their upper edge to engage the hooks 38. The burlap curtains 40 hang down to within about twenty-four to thirty inches from the ground so as to be engaged by calves as well as larger livestock when they pass through the gateway between posts 12 and 13.

As the animals pass through the gateway they brush through and under the suspended burlap curtains 40. Thus the bin 10 is caused to rock causing the insecticidal powder "A" within the bin 10 to be tumbled or sufficiently disturbed so as to siftably release a portion of it through the screen 21. As the powder sifts through the screen it falls as a cloud of powdered dust within the confines of the burlap curtains 40. This cloud of dust envelopes the body of the animal passing there-beneath, and thus kill any pest adhering to its hide or on or about the same. Moreover, the presence of the dust on the hide will kill flies which later light upon the animal.

The lengths of the bins 10 and the corresponding widths of the burlap curtains 40 are of such a magnitude, about three feet, that when only one animal passes through the gateway he may cause the rocking of one of the bins 10 without disturbing the other.

From the foregoing it will be appreciated that I have provided a novel animal duster automatically propelled by the animal while passing therebeneath for applying a coat of insecticide powder to the hide of the animal. The arrangement is simple in construction and constantly ready for operation. Should it become empty this fact is readily perceivable by the absence of dust clouds when the animals pass beneath it. It is simply refilled with insecticide powder and has proven successful in use. As a matter of fact, animals raised in a pasture provided with the present invention have had no loss of weight and the presence of flies or infectious scabs or sores from insects has been at a minimum.

While I have illustrated and described a preferred embodiment, it will be understood however that changes and modifications may be made in the details thereof without departing from the scope of the invention as set forth in the appended claims.

Having thus described the invention, what I claim as new and desire to protect by Letters Patent is defined in the following claims.

I claim:

1. The combination with a gateway between pasture and a watering place, of an animal duster comprising a tank-like bin having upper and lower rounded walls closed at their ends by ovoid end walls, a bearing boss in each said end wall of said bin disposed above the center of the arc about which said rounded lower wall is formed, a cross bar extending through said bearing bosses and having its ends supported on either side of said gateway to facilitate rocking of said bin above the same, the rounded lower wall of said bin having an opening in the lower quadrant thereof with longitudinal parallel spaced side margins between the end walls of said bin, a screen overlying the opening in the rounded lower wall of said bin, a supply of dusting powder supported on said screen, and a shroud cloth suspended from at least one longitudinal side margin of the opening in the lower wall of said bin for engagement by an animal to thereby rock said bin and agitate the powder therein for sifting through said screen.

2. The combination with a gateway through which animals must pass from pasture to a watering place or the like and vice versa, apparatus for dusting an animal comprising a bin having rounded upper and lower walls and parallel side walls of a length to span the width of at least one animal, ovoid shaped end walls secured to each end of said bin for closing the ends thereof, a cross-bar supported crosswise above said gateway for rockably supporting one or more of said bins across the same, each bin having a bearing passage formed through its end walls for journalled support upon said cross bar, said bearings being disposed above the center of the arc about which the lower wall of said bin is rounded to facilitate rocking of said bin, the rounded lower wall of said bin having an elongated opening formed therethrough, a screen secured to the rounded lower wall of said bin to cover the opening formed therethrough, said bin having an access opening formed therein between its upper and lower walls for receiving a dusting powder, a removable cover for said access opening, a plurality of hooks in rows on each side wall of said bin, and a pair of shroud cloths suspended from said rows of hooks for engagement by an animal to rock said bin and for directing clouds of dust sifting through said screen down upon the animal.

References Cited in the file of this patent

UNITED STATES PATENTS

| | | |
|---|---|---|
| 472,456 | Hawley | Apr. 5, 1892 |
| 1,091,900 | Sutton | Mar. 31, 1914 |
| 1,167,561 | Hudson | Jan. 11, 1916 |
| 1,381,715 | Larkin | June 14, 1921 |
| 2,702,020 | Worden | Feb. 15, 1955 |
| 2,711,722 | Gray | June 28, 1955 |